United States Patent
Fréchette

(10) Patent No.: US 9,943,072 B2
(45) Date of Patent: Apr. 17, 2018

(54) LOOPWORK ROPE FOR MUSSEL CULTURE

(71) Applicant: R-D Mytis Ltd., Mont-Joli (CA)

(72) Inventor: Marcel Fréchette, Mont-Joli (CA)

(73) Assignee: R-D MYTIS LTD., Mont-Joli, QC (CA)

( * ) Notice: Subject to any disclaimer, the term of this patent is extended or adjusted under 35 U.S.C. 154(b) by 97 days.

(21) Appl. No.: 14/392,076

(22) PCT Filed: Feb. 24, 2014

(86) PCT No.: PCT/CA2014/000129
§ 371 (c)(1),
(2) Date: Sep. 11, 2015

(87) PCT Pub. No.: WO2014/183190
PCT Pub. Date: Nov. 20, 2014

(65) Prior Publication Data
US 2016/0205903 A1    Jul. 21, 2016

Related U.S. Application Data

(60) Provisional application No. 61/855,406, filed on May 15, 2013.

(51) Int. Cl.
*A01K 61/00* (2017.01)
*A01K 61/65* (2017.01)
*A01K 61/54* (2017.01)

(52) U.S. Cl.
CPC .............. *A01K 61/65* (2017.01); *A01K 61/54* (2017.01)

(58) Field of Classification Search
CPC ........ A01K 61/65; A01K 61/70; A01K 69/00; A01K 69/02; A01K 74/00; A01K 75/00
See application file for complete search history.

(56) References Cited

U.S. PATENT DOCUMENTS 3,483,907 A * 12/1969 Corridon ................ A45C 3/045
                                                         224/601
3,678,900 A    7/1972 Kolesa
(Continued)

FOREIGN PATENT DOCUMENTS

CA    1081061    7/1980
CA    1093401    1/1981
(Continued)

OTHER PUBLICATIONS

Author: Unknown; Title: Gael Force Knitted Danline Mussel Rope; publication date: Unknown; published by www.gaelforcemarine.co.uk.
(Continued)

*Primary Examiner* — Kristen C Hayes
(74) *Attorney, Agent, or Firm* — Mario Theriault

(57) ABSTRACT

The mussel culture rope is made of interlooped hitches providing hollows, crevices and cavities for sheltering young mussels against predators and for providing extended attachment surface to retain growing mussels. The loopwork is a recyclable type loopworks having a fixed knot at a starting end thereof and a releasable knot and a loopwork release segment at a terminal end thereof. The loopwork is recycled into a plain rope during harvest and braided again for a subsequent culture cycle.

13 Claims, 6 Drawing Sheets

(56) References Cited

U.S. PATENT DOCUMENTS

| | | | |
|---|---|---|---|
| 4,047,316 A * | 9/1977 | Maruyama | A01K 75/00 43/7 |
| 4,789,045 A | 12/1988 | Pugh | |
| 4,833,815 A * | 5/1989 | Kershaw | A01K 85/005 43/100 |
| 4,938,161 A | 7/1990 | Blackmer | |
| 5,211,710 A * | 5/1993 | Nagano | D04B 31/02 66/1 A |
| D382,678 S | 8/1997 | Weinacker, Jr. | |
| 5,711,254 A | 1/1998 | O'Rourke | |
| 7,341,021 B2 | 3/2008 | Cortinas et al. | |
| 2007/0151923 A1 | 7/2007 | Haley, III | |
| 2009/0038206 A1 | 2/2009 | Conte | |
| 2011/0162414 A1 * | 7/2011 | Smith | D04B 3/00 66/169 R |

FOREIGN PATENT DOCUMENTS

| | | |
|---|---|---|
| CA | 2130099 | 9/1993 |
| CA | 2178203 | 6/1995 |
| CA | 2332086 | 4/2001 |
| CA | 2420918 | 9/2003 |
| CA | 2489721 | 3/2005 |
| CA | 2535821 | 3/2005 |
| CA | 2556556 | 9/2005 |
| DE | 003938266 | 5/1991 |
| DE | 29619908 | 12/1997 |
| EP | 2407027 | 1/2012 |

OTHER PUBLICATIONS

Author: Philip Tortell, Title: A New Rope for Mussel Farming, publication: Apr. 22, 1976; in Aquaculture, 8(1976) pp. 383-388.

* cited by examiner

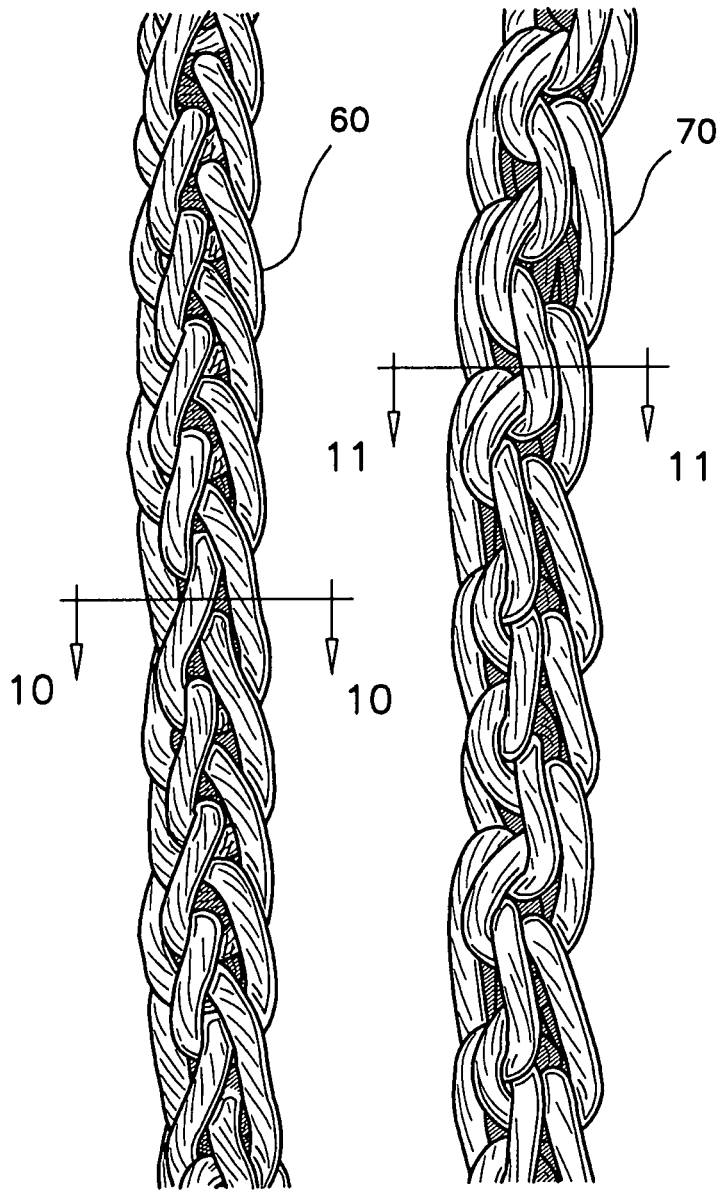
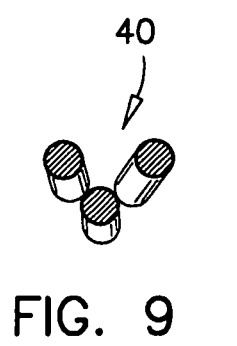
FIG. 9
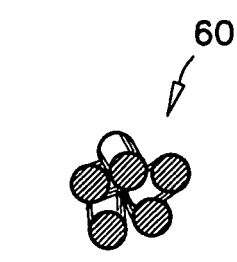
FIG. 10
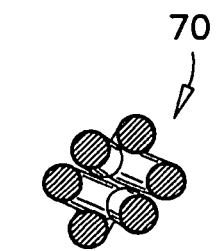
FIG. 11
FIG. 7    FIG. 8

LOOPWORK ROPE FOR MUSSEL CULTURE

This application claims the benefit of US Provisional Application No. 61/855,406, filed May 15, 2013.

FIELD OF THE INVENTION

This invention pertains to mussel culture ropes, and more particularly, it pertains to mussel culture ropes made of interlooped hitches, offering shelter and attachment surfaces to growing mussels.

BACKGROUND OF THE INVENTION

Mussel culture is done under sea water, generally. Culture ropes are hung underwater from various structures such as a raft or a long horizontal rope referred to in the field as a "mainline" or "back line". Buoyancy devices are tied to the mainline with the culture ropes hanging below the mainline.

In nature, wild mussel spat or "seeds" settle on the culture ropes at the end of the larvae life. The culture ropes preferably have a filamentous surface, simulating natural settling environments such as algal mats. In certain applications, however, mussel culture ropes are made of used ropes discarded by other fisheries, for example.

Subsequently to spat collection, the mussels are either left to grow on the culture ropes; transferred to tubular sock-like netting, or left on the ropes and encapsulated into tubular sock-like netting. The netting is often made of cotton which eventually dissolves to facilitate harvest.

Amongst the factors affecting crop yields, there are of course; water quality, and the abundance of food at a particular site. There are, however, three additional factors that can bring about great losses despite being at a perfect culture site. These factors are: limited attachment surface area provided by the culture ropes; predation of juvenile mussels by finfish and diving ducks; and the rubbing of culture ropes against each other in rough seas.

Referring to the first disadvantage, population density on a mussel collector undergoes a self-thinning process as mussels grow. Some fall off the culture ropes because of a lack of substrate surface area to attach themselves to. Mussels falling off the ropes are destroyed by crabs, starfish and other animals living in the sea floor habitat.

There is more to consider in reference with predation by other animals. Some duck species can dive to 10 meter (33 feet) underwater for over one minute at a time. Although ducks prefer small mussels under 30 mm (1.2 inch) in diameter, they can eat larger mussels, swallowing shell and all and crushing the shells in their gizzard (muscular stomach). Mussel predation is a serious problem as in many cases mussel population on culture ropes can be reduced to the point where operations are no longer profitable. Ideally, mussel spat need to be protected from sea ducks until they can reach a size of about 4 cm (1.6 inch) in diameter.

In rough seas, suspended culture ropes are sometime brought closer to each other than their initial setting. Some mussel spat attach themselves to these juxtaposed ropes. Plain ropes offer no hollow, crevice or cavity to shelter and to protect cultured mussels from being scraped off the ropes during the rubbing of these ropes against each other. Therefore, some culture ropes can be wiped clean of mussel spat in a single storm.

The following documents represent a good inventory of the mussel culture methods and installations included in the prior art.

A New Rope for Mussel Farming: published in Aquaculture, 8 (1976) pp. 383-388, by Elsevier Scientific Publishing Company, Amsterdam, authored by Philip Tortell on Apr. 22, 1976. This document describes a fibrous rope having tufts of fibers spaced there along to facilitate collection and retention of mussel spat to the rope.

U.S. Pat. No. 3,678,900 issued to C. M. Kolesa on Jul. 25, 1972. This document discloses a system for harvesting shellfish using culture chains that are laid directly on the sea floor.

U.S. Pat. No. 7,341,021 issued to A. Q. Cortinas, et al., on Mar. 11, 2008. This document illustrates mussel culture ropes suspended vertically underwater to parallel cables.

CA Patent 2,178,203 issued to J. D. Saxby et al., on Jun. 15, 1995. This document discloses a method for cultivating mollusks using a netting bag suspended horizontally under water.

CA Patent Application 2,420,918, filed by Gilles Gagnon on Mar. 5, 2003. This document discloses a disc-like device for attachment to a mussel culture rope to prevent slipping of the mussels as they grow and overcrowd the ropes.

CA Patent 2,332,086 issued to Ian W. Jefferds on Aug. 19, 2003, This document discloses mussel culture ropes suspended underwater to a floating raft. Disc-like supports are mounted at intervals to each rope to prevent slipping of the mussels as they grow and the culture rope becomes over populated.

CA Patent Application 2,535,821 filed by P. Kvietelaitis, on Sep. 10, 2004. This document discloses culture ropes suspended underwater to a mainline supported by buoys. The culture ropes are encapsulated in netting socks.

CA Patent Application 2,556,556 filed by P. Kvietelaitis on Feb. 18, 2005. This document discloses an apparatus and a method for seeding and encapsulating a culture rope with young mussels.

Although the method of encapsulating a culture rope in a protective netting sleeve provides protection to growing mussels against predators and against slipping, the netting material represents an impediment to mussel spat retrieval prior to sleeving and may interfere with normal growth. Therefore, there is still a need in the aquaculture industry for a mussel culture installation that can provide both an efficient collection of mussel spat at the beginning of the culture cycle and a good protection of young mussels from predators and from shrinking attachment surface area.

SUMMARY OF THE INVENTION

In the present invention, however, there is provided a mussel culture rope, this is made of interlooped hitches providing hollows, crevices and cavities for sheltering young mussels against predators and for providing extended attachment surface area.

In one aspect of the present invention, there is provided a mussel culture rope comprising a terminal end, a starting end and a loopwork of spaced-apart hitches between the terminal end and the starting end. The loopwork belongs to a type of loopworks that includes: one-element-one-loop-per-hitch; one-element-two-loops-per-hitch; one-element-four-loops-per-hitch; two-elements-one-loop-per-hitch; two-elements-one-loop-per-hitch-triangular; and two-elements-two-loops-per-hitch.

These loopworks are advantageous in that they provide a rich three-dimensional configuration with multiple hollows, crevices and cavities per unit of length, and wherein the number of hitches per unit of length is adjustable to suit culture conditions.

In another aspect of the present invention, the loopwork is a recyclable type loopwork having a fixed knot at the starting end and a releasable knot and a loopwork release segment at the terminal end, and the terminal end is mounted in an uppermost position of the culture rope, in use.

In another aspect of the present invention, there is provided a method for the culture of mussels. The method includes the step of causing mussel spat to attach to a culture rope, wherein the culture rope comprises a recyclable loopwork made of spaced-apart hitches.

In still another aspect of the present invention, there is provided a method for the culture of mussels comprising the steps of recycling the loopwork into a plain rope during the harvesting of mussels from the culture rope, and braiding the loopwork again after the step of harvesting, prior to setting the rope again for a subsequent culture cycle.

In a further aspect of the present invention, there is provided an installation for harvesting mussels grown on a recyclable loopwork culture rope, comprising; a reel for recycling the loopwork into a single strand plain rope; and a loop forming device for forming the loopwork again following the step of harvesting. The reel and loop forming device are mounted in a boat.

The recyclable loopwork culture rope according to the present invention provides shelter to young mussels against predators; it provides extended settling surfaces for growing mussels to attach to, and it provides for an improved method of harvesting mussels grown thereon.

This brief summary has been provided so that the nature of the invention may be understood quickly. A more complete understanding of the invention can be obtained by reference to the following detailed description of the preferred embodiments thereof in connection with the attached drawings.

BRIEF DESCRIPTION OF THE DRAWINGS

Three preferred embodiments of the mussel culture rope according to the present invention are illustrated in the attached drawings. In these drawings;

FIG. 7 illustrates a second preferred embodiment of the loopwork culture rope according to the present invention;

FIG. 8 illustrates a third preferred embodiment of the loopwork culture rope according to the present invention;

FIG. 9 is a cross-section view through the loopwork culture rope according to the first preferred embodiment as seen substantially along line 9-9 in FIG. 5;

FIG. 10 is a cross-section view through the loopwork culture rope according to the second preferred embodiment as seen substantially along line 10-10 in FIG. 7;

FIG. 11 is a cross-section view through the loopwork culture rope according to the third preferred embodiment as seen substantially along line 11-11 in FIG. 8;

DETAILED DESCRIPTION OF THE PREFERRED EMBODIMENTS

Figure 1:
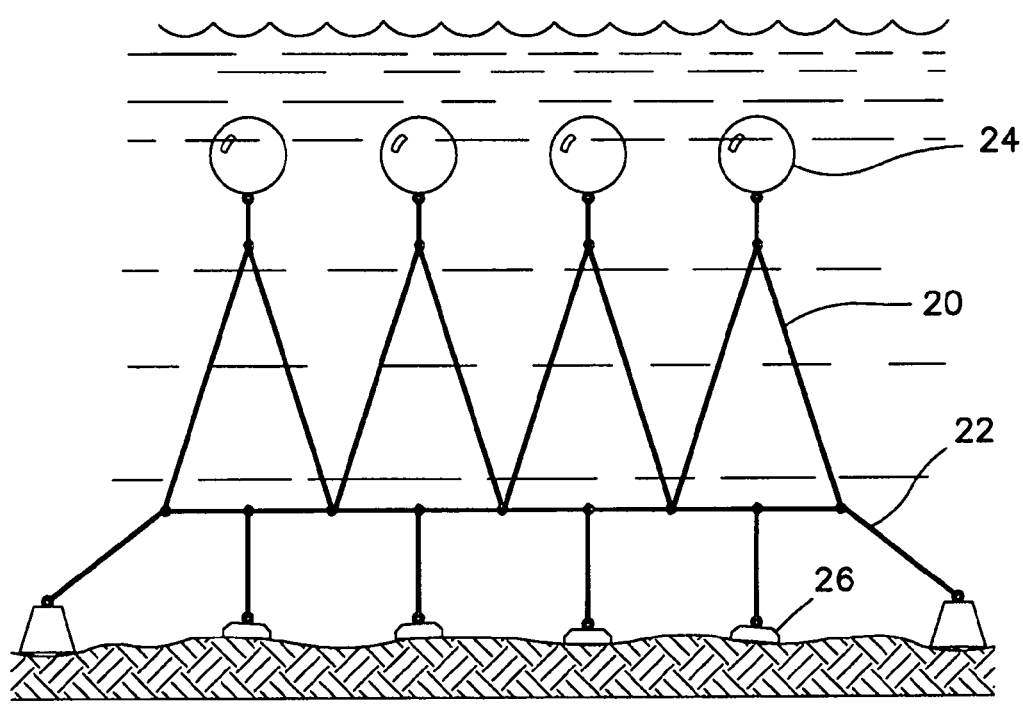
FIG. 1 is a schematic illustration of a common mussel culture installation, referred to in the industry as a "self-regulated collector" installation or "autocollector", with oblique culture ropes.

While this invention is susceptible of embodiment in many different configurations, there are shown in the drawings and will be described in details herein, three specific embodiments of a loopwork culture rope for mussels. It should be understood that the present disclosure illustrates and describes only three types of ropes made of interlooped hitches. Other types of similarly loopworks can also be used. Therefore, the embodiments presented herein should be considered as examples of the principles of the invention and is not intended to limit the invention to the embodiments illustrated and described.

Referring to FIG. 1, a typical mussel culture installation is made of culture ropes 20 strung in a sawtooth arrangement along an anchor line 22. The culture lines 20 are suspended to buoys 24. The anchor line 22 is retained near the sea floor by spaced-apart anchor blocks 26. For reference purposes, each culture rope 20 has a length of about 3.3 m (11 ft.), and are spaced apart along the anchor line a distance of about 1.8 m (6 ft.). This common mussel culture installation is generally installed in about 15-18 m (49-59 ft.) of water, with the anchor line retained at about 1 m (3.3 ft.) from the sea floor. A typical installation can have about two hundred culture ropes 20 suspended along a single anchor line 22.

A typical mussel culture rope 20 is made of polypropylene material and has a diameter of about 10 mm (⅜ inch) to 16 mm (⅝ inch). This type of installation is referred to as a "self-regulated collector" or "autocollectors".

Although only one common mussel-culture installation is illustrated herein, there are many different ways to suspend mussel culture ropes under sea water, and therefore, it should be appreciated that the mussel culture ropes according to the present invention can be used in other mussel culture installations as well. One of the most common mussel-culture installations consists of suspending the culture ropes straight down from a raft for example. In this most basic installation, it is advantageous to suspend the loopwork culture ropes according to the present invention with their terminal ends near the surface, as will be appreciated from the following disclosure.

Figure 2:
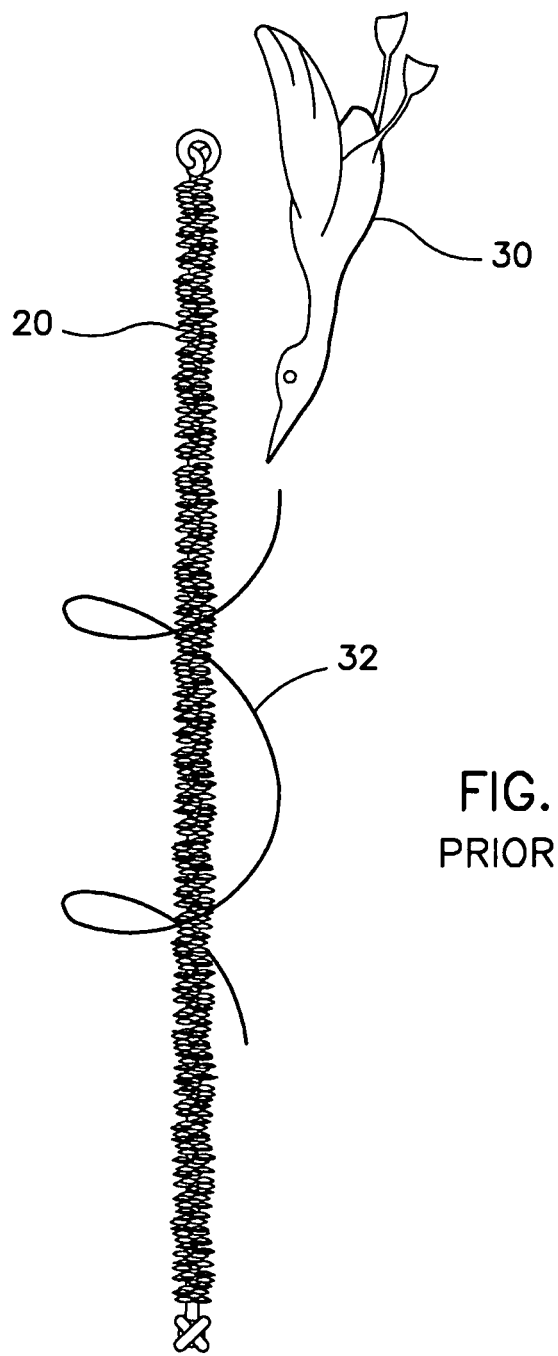
FIG. 2 shows duck diving along a mussel culture rope, for feeding on mussels along the rope.

FIG. 2 illustrates a sea duck 30 in a typical diving motion along a mussel culture rope 20 suspended straight down, progressing in a typical spiral motion 32 while feeding on young mussels along the rope. This illustration is presented herein in order to better demonstrate the advantages obtained with the loopwork culture rope according to the present invention.

Figures 3, 4:
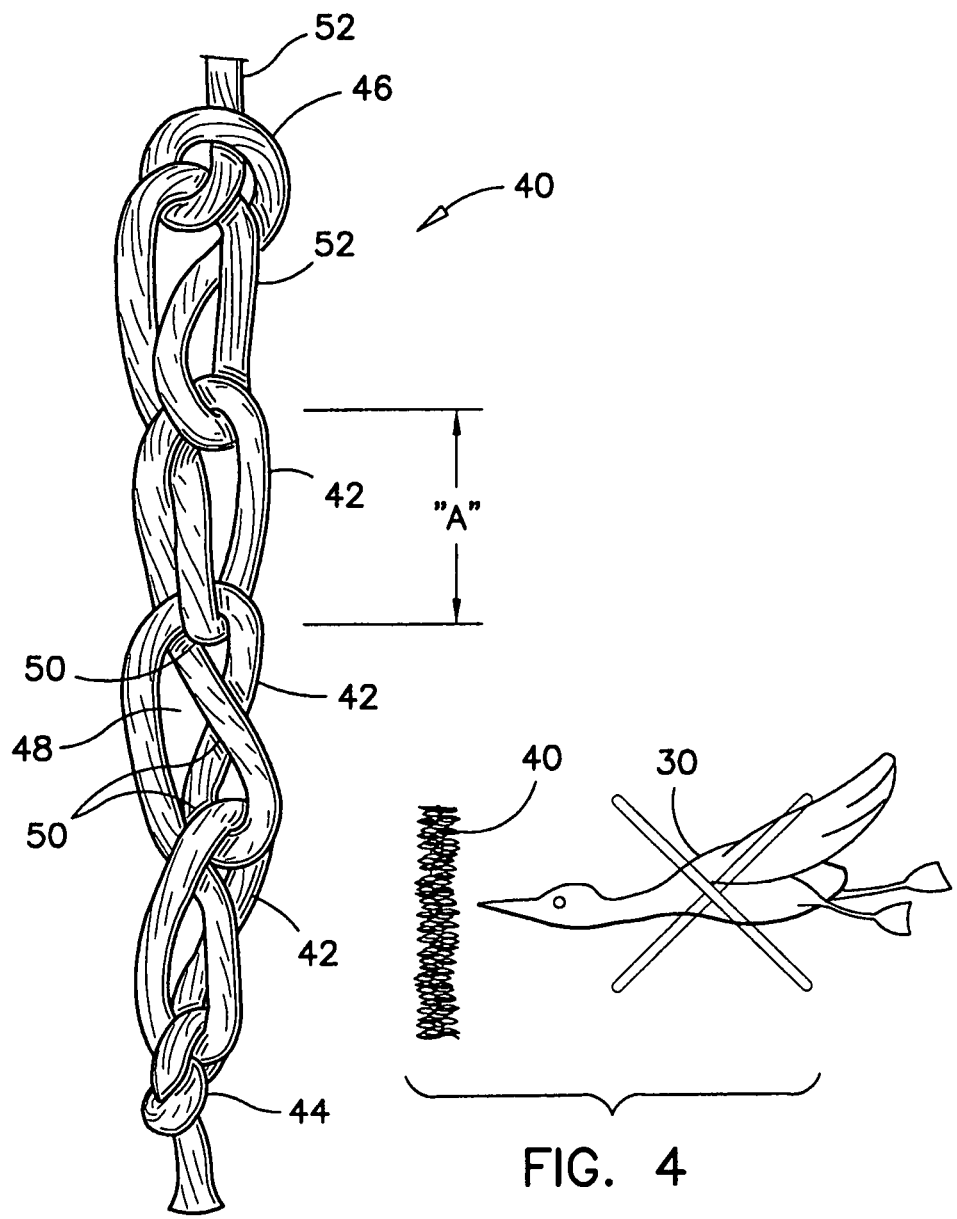
FIG. 3 illustrates a first embodiment of a loopwork culture rope according to the present invention.
FIG. 4 illustrates a challenge offered to a diving duck by the loopwork culture rope according to the present invention.

Referring now to FIG. 3, the first preferred embodiment of the loopwork mussel culture rope 40 according to the present invention is illustrated therein. The culture rope 40 is made of interlooped hitches 42 with a knot 44 at the starting end and a locked loop 46 at the terminal end. The hitches 42 are preferably interlooped loosely, wherein the illustrated pattern is as tight as it should be. The distance "A"

between hitches is preferably 15-30 cm (6-12 inches), but longer or shorter loops would also work. The diameter of the rope is preferably between about 10 mm (3/8 inch) to about 16 mm (5/8 inch) in diameter, and it is preferably made of filamentous polypropylene, although other materials would also work.

This type of interlooped hitches 42 creates voids 48 and crevices 50 offering shelter to young mussels. This type of interlooped hitches 42 provides greater attachment surface area than a single plain rope, thereby increasing yield per meter and reducing fall-off from overcrowding.

This type of interlooped hitches 42 makes it very difficult for a sea duck to feed on young mussels that are sheltered in the crevices and hollows of the rope 40. As can be appreciated from FIG. 4 a sea duck 30 would have to align its bill horizontally, as shown, in order to reach into the voids 48 and crevices 50 of the rope 40. In order to feed on small mussels from the cavities and crevices of the ropes, a sea duck 30 would have to swim horizontally, as shown. Because a duck must continuously paddle its feet to stay underwater, it cannot maintain a position where its bill would be oriented at a right angle to the culture rope. Therefore, the position of a duck 30 as illustrated in FIG. 4 is an impossible position for a sea duck. A sea duck 30 cannot feed on mussels sheltered in the hollows and crevices of the rope 40. This drawing helps to understand the reasons why the loopwork culture rope 40 offers shelter to young mussels against its most damaging predators.

The type of interlooped hitches 42 as shown in FIG. 3 is known as "Chain Sinnet". In this type of interlooping, the hitches are made from a single strand or element of rope and a single loop per hitch. This is the most basic structure of a preferred loopwork culture rope 40. Other names are also used to designate this type of basic loopwork. Other names include: Non-Jamming Knots; Chain Sennit; Chain Shortening; Monkey Braid; Single Trumpet Cord; Single Bugle Cord; Double Chain Stitch; Spinal Sinnet, or Crochet Stitch.

The loopwork mussel culture rope 40 can be used for both spat collection and as a growing substrate. The loopwork mussel culture rope 40 can be used with or without socks, in common mussel culture installations, and directly on the sea floor in a bottom culture installation. The preferred loopwork mussel culture rope 40 can also be used with spaced-apart cross pegs or discs to support an overpopulation of mussels on the rope.

Figure 5:
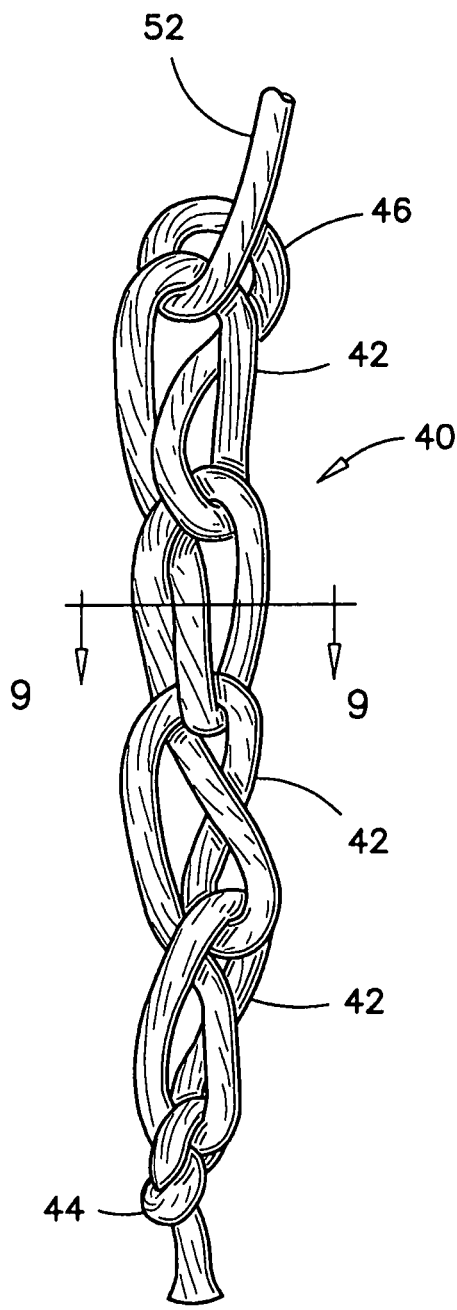
FIG. 5 is an elevation view of the loopwork culture rope according to the first preferred embodiment of the present invention, showing a preferred orientation of the preferred loopwork and the structure of the terminal hitch thereof.
Figure 6:
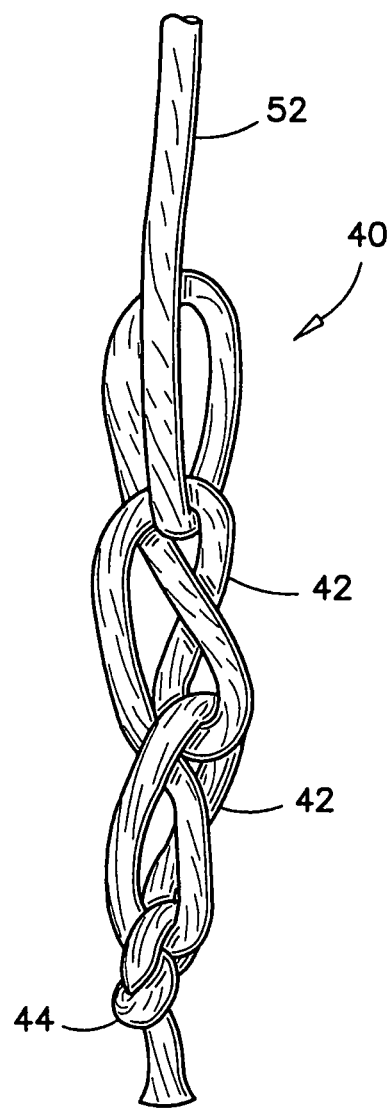
FIG. 6 is another elevation view of the culture rope according to the first preferred embodiment of the present invention, showing the unhitching or recycling of the loopwork thereof.

Another advantage of the preferred loopwork mussel culture rope 40 is that it is easily undone to facilitate harvest. Referring to FIGS. 3, 5 and 6, the terminal segment 52 can be pulled out from the last loop 46, as it may be understood from FIG. 3. The terminal segment 52 is shown in a pulled-out and released mode from the last loop 46 in FIG. 5. Then the action of pulling upward on the terminal segment 52 causes the uppermost hitch 42 to become undone, as shown in FIG. 6, and then the second hitch 42 is undone, and so on until the entire loopwork rope is recycled into a plain rope. Although FIGS. 3, 5 and 6 appear at first glance to illustrate similar features, it will be appreciated that FIG. 3 shows a locked loop 46 at the terminal upper end of the loopwork culture rope; FIG. 5 shows the locked loop being undone, and FIG. 6 shows a hitch being undone.

The terminal end of a culture rope 40 has the terminal segment 52 by which the interlooping can be undone. The terminal end of a culture rope is referred to as the release end, and the starting end of a culture rope 40 is considered as the fixed end. During harvest, each culture rope 40 is hoisted into a boat and the release segment 52 is untied and pulled upon. As the hitches 42 are undone, the mussels are stripped from the rope, due to the friction of the rope against itself in each loop. The loopwork on the culture ropes 40 is preferably braided again before reinstalling the culture ropes 40 for a subsequent culture cycle.

As an example of a second preferred loopwork that can be used on the mussel culture rope 40 according to the present invention, FIG. 7 illustrates a loopwork rope 60 that is made of a single element with two loops per hitch. This type of loopwork is known as Square Loop Sinnets, because of its generally square cross-section. Similarly, a one-element-four-loop-per-hitch loopwork can also be used in the loopwork culture rope according to the present invention. This latter type of loopwork is known as French Knitting; Corking; Rat's Tail, or Peg Knitting.

A third embodiment of a loopwork culture rope 70 is illustrated in FIG. 8. This loopwork has two elements and two loops per hitch. This type of loopwork is known as Two Chain Sinnets. Similarly, a two-element-one-loop-per-hitch loopwork can also be used. This last loopwork is known as Double Loop Chain; Serbian Cord, Crocket Cord and Idiot's Delight. A triangular-two-elements-one-loop-per-hitch loopwork is also known and can be used in the loopwork culture rope according to the present invention.

Although only three loopwork patterns have been illustrated herein, it will be appreciated that the other patterns mentioned above can be used to form the mussel culture rope according to the present invention. All these loopwork patterns are characterized in that they can be undone by pulling on the release segment(s) thereof. It will be appreciated that when a two element rope is formed, it can be undone by pulling simultaneously on two release segments. Because the loopwork patterns described herein can be undone to facilitate harvest and redone for a subsequent culture cycle, these loopwork culture ropes are qualified as being "recyclable".

The single-element-single-loop-per-hitch rope 40 has a three elements in its cross-section as can be seen in FIG. 9, and four and five elements (not shown) at the intersection of the hitches. The single-element-two loops-per-hitch rope 60 has five elements in its cross-section, and the two-elements-two-loops-per-hitch rope 70 has six elements in its cross-section. It will be appreciated that the retention surface area of each rope is increased substantially in a same proportion as the number of elements in its respective cross-section. For example, the single-element-single-loop-per-hitch rope 40 has approximately three times the retention surface area as a single plain rope of the prior art.

Figure 12:
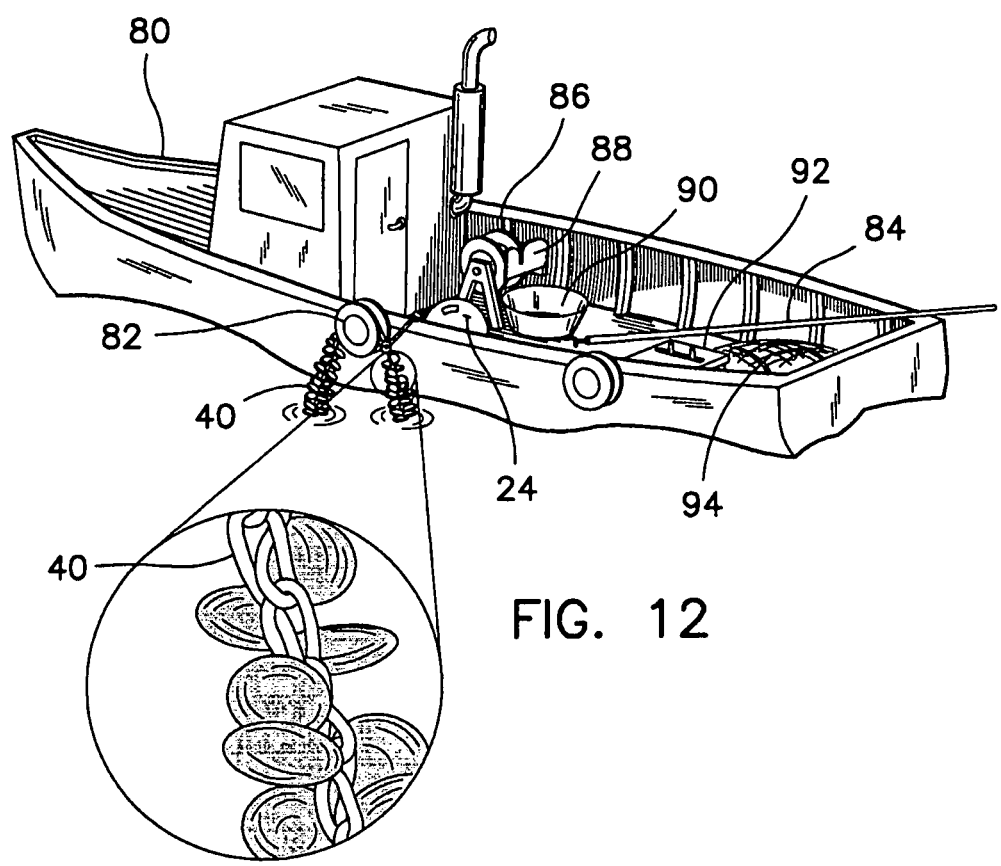
FIG. 12 illustrates a preferred system for harvesting a crop of cultured mussels from the preferred loopwork culture ropes, with a magnified portion of the loopwork culture rope.

Referring now to FIG. 12, a boat 80 is represented therein. A preferred method for harvesting a crop of mussels from the mussel culture rope 50 according to the represent invention is illustrated. The method consists of raising a mussel culture line 40 on a starwheel 82 of the boat using a wood pole 84 and hook for example or otherwise; detaching the culture rope(s) 40 from the anchor line (both ends may be attached to the anchor line in some mode of practicing an autocollector installation for example); detaching the culture rope(s) 40 from its respective buoy 24, undoing the terminal end of each loopwork culture rope 40, undoing the loopwork of the rope by winding the rope on a reel 86, against a stripper plate 88 for example, while collecting mussels in a container 90. If required, the loopwork on each culture rope can be redone manually or semi-automatically on a loop forming machine 92 mounted directly on the boat. Normally, however, the ropes 94 from the culture lines 40, are brought to shore and set to dry. Drying reduces slime on the ropes and enhance spat collection during the next culture cycle.

The loopwork are redone along the rope prior to resubmerging the culture lines for another culture cycle.

The loopwork can be redone on the boat or on land. When the loopwork culture ropes 40 are used as a growing substrate inside a tubular sock-like netting, the culture lines are generally made by socking machines set in a plant on dry land. In these cases, the loopwork culture rope 40 already formed can be fed by the machine into the sock-like netting, together with the seed mussels. The advantageous results are the same; the loopwork offers shelter and enhanced attachment surface to the growing mussels.

Whether the loopwork mussel culture ropes are made in a boat or on land, the terminal end should be identified with paint or a coloured tag for examples to facilitate the handling of the rope at harvest time.

The single-element-one-loop-per-hitch loopwork rope 40 according to the first preferred embodiment of the present invention has been tested in the Saint-Laurent seaway in Carleton, Québec, Canada during the summer and fall of 2013. Ropes with a hitch spacings of 15 cm (6 inches) and 30 cm (12 inches) were tested against single plain ropes. The shorter hitch spacing gave an average yield increase of 6.2% at the deep ends of the culture ropes and 98.7% at the upper ends for an overall average yield increase of 52.5%. The longer hitch spacing gave a yield increase of 58.7% at the deeper ends of the ropes and 147% at the upper ends for an overall average yield increase of 103%. From these test results, it will be appreciated that the loopwork culture rope according to the present invention contributes greatly to increase yield in a mussel culture installation, and it will also be appreciated that a loose hitch formation is advantageous over a tighter one.

The above description and the drawings should not be construed as limiting the scope of the invention, which is defined by the appended claims.

What is claimed is:

1. A mussel culture rope suspended in mussel-growing water, comprising a filamentous mussel-retention rope material; a terminal end, a starting end and a loopwork of spaced-apart interlooped hitches between said terminal end and said starting end; said loopwork being a recyclable loopwork wherein said spaced-apart hitches can be undone and recycled into an knotted plain rope during mussel harvest by pulling on said terminal end; said recyclable loopwork belonging to a group of recyclable loopworks including loopworks known as Chain Sinnet; Non-Jamming Knots; Chain Sennit; Chain Shortening; Monkey Braid; Single Trumpet Cord; Single Bugle Cord; Double Chain Stitch; Spinal Sinnet; Crochet Stitch; Square Loop Sinnets; French Knitting; Corking; Rat's Tail; Peg Knitting; Two Chain Sinnets; Double Loop Chain; Serbian Cord; Crocket Cord, and Idiot's Delight.

2. The mussel culture rope as claimed in claim 1, wherein said starting end has a fixed knot thereon, and said terminal end has a releasable knot thereon.

3. The mussel culture rope as claimed in claim 2, wherein said terminal end has a rope segment that is releasably engaged in said releasable knot.

4. The mussel culture rope as claimed in claim 1, wherein said loopwork also belongs to a group of loopworks known as a single-element-single-loop-per-hitch loopwork.

5. The mussel culture rope as claimed in claim 1, wherein said loopwork also belongs to a group of loopworks including: one-element-one-loop-per-hitch; one-element-two-loops-per-hitch; one-element-four-loops-per-hitch; two-elements-one-loop-per-hitch; two-elements-one-loop-per-hitch-triangular; and two-elements-two-loops-per-hitch.

6. The mussel culture rope as claimed in claim 1, wherein said loopwork has three elements in a cross-section thereof.

7. The mussel culture rope as claimed in claim 1, wherein said loopwork has five elements in a cross-section thereof.

8. The mussel culture rope as claimed in claim 1, wherein said loopwork has six elements in a cross-section thereof.

9. The mussel culture rope as claimed in claim 1, wherein said loopwork has between three and six elements in a cross-section thereof.

10. The mussel culture rope as claimed in claim 1, wherein a spacing between said spaced-apart hitches is adjustable.

11. The mussel culture rope as claimed in claim 1, wherein said loopwork also belongs to a group of loopworks that are made and remade manually.

12. The mussel culture rope as claimed in claim 1, wherein said filamentous mussel-retention rope material has a diameter of between $3/8$ inch to $5/8$ inch, and a distance between said hitches is between 6 and 12 inches.

13. The mussel culture rope as claimed in claim 12, wherein said hitches being interlooped loosely defining voids extending there-across, and said voids being as big as said diameter of said rope material.

* * * * *